(12) United States Patent
Sakayanagi et al.

(10) Patent No.: US 12,409,752 B2
(45) Date of Patent: Sep. 9, 2025

(54) COMMUNICATION CONTROLLER

(71) Applicant: TOYOTA JIDOSHA KABUSHIKI KAISHA, Toyota (JP)

(72) Inventors: Yoshihiro Sakayanagi, Mishima (JP); Midori Sugiyama, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 530 days.

(21) Appl. No.: 18/072,816

(22) Filed: Dec. 1, 2022

(65) Prior Publication Data
US 2023/0278450 A1    Sep. 7, 2023

(30) Foreign Application Priority Data

Jan. 31, 2022  (JP) .................................. 2022-013200

(51) Int. Cl.
*B60L 53/66*    (2019.01)
*B60L 53/63*    (2019.01)

(52) U.S. Cl.
CPC ............... *B60L 53/66* (2019.02); *B60L 53/63* (2019.02)

(58) Field of Classification Search
CPC .................................................... B60L 53/66
USPC ....................................................... 320/109
See application file for complete search history.

(56) References Cited

U.S. PATENT DOCUMENTS

| | | | |
|---|---|---|---|
| 2012/0262002 A1* | 10/2012 | Widmer | H02J 50/20 307/104 |
| 2013/0038272 A1* | 2/2013 | Sagata | H02J 50/80 320/108 |
| 2015/0042168 A1 | 2/2015 | Widmer | |
| 2015/0065053 A1 | 3/2015 | Cho et al. | |
| 2015/0165923 A1 | 6/2015 | Hirayama et al. | |
| 2016/0297314 A1* | 10/2016 | Iwai | B60L 53/68 |

FOREIGN PATENT DOCUMENTS

| | | |
|---|---|---|
| JP | 2013-033423 A | 2/2013 |
| JP | 2014-017747 A | 1/2014 |
| JP | 2014-518607 A | 7/2014 |
| JP | 2015-082964 A | 4/2015 |
| JP | 2016-535577 A | 11/2016 |
| JP | 2016-538792 A | 12/2016 |
| JP | 2018-117456 A | 7/2018 |

* cited by examiner

*Primary Examiner* — Jerry D Robbins
(74) *Attorney, Agent, or Firm* — Dinsmore & Shohl LLP

(57) ABSTRACT

A communication controller includes an activation control unit configured to activate signal output processes of respective first communication units of a plurality of noncontact power supply devices so that signals output from the respective first communication units cause no radio frequency interference with each other, and a pairing control unit configured to pair a vehicle with the noncontact power supply device including a first communication unit corresponding to a signal having a highest radio field intensity among the signals output from the respective first communication units and received by a second communication unit of the vehicle.

8 Claims, 12 Drawing Sheets

FIG. 6
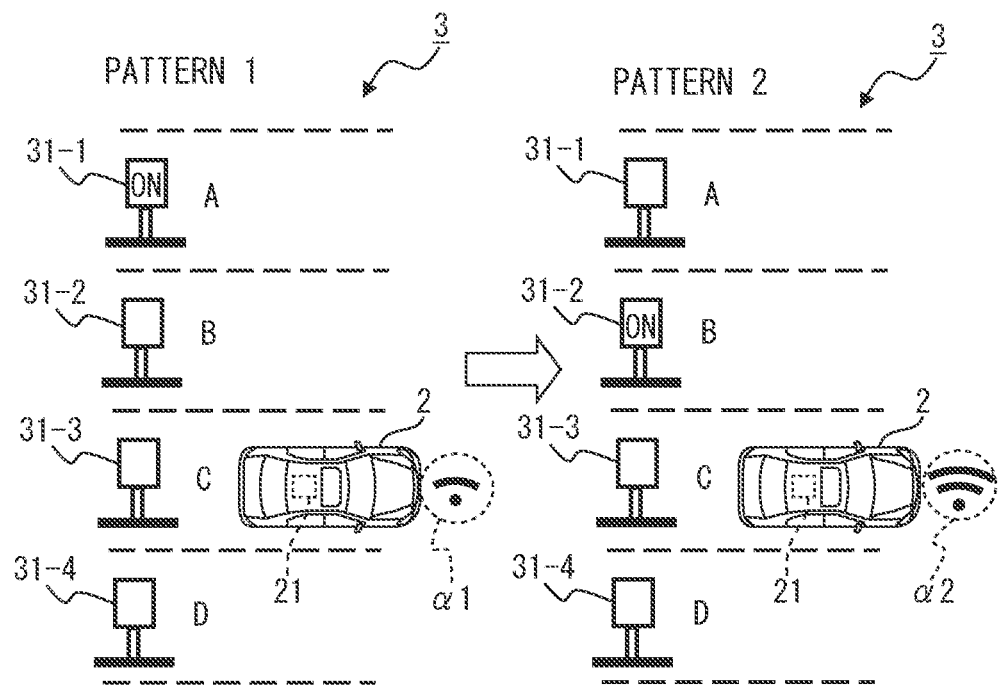
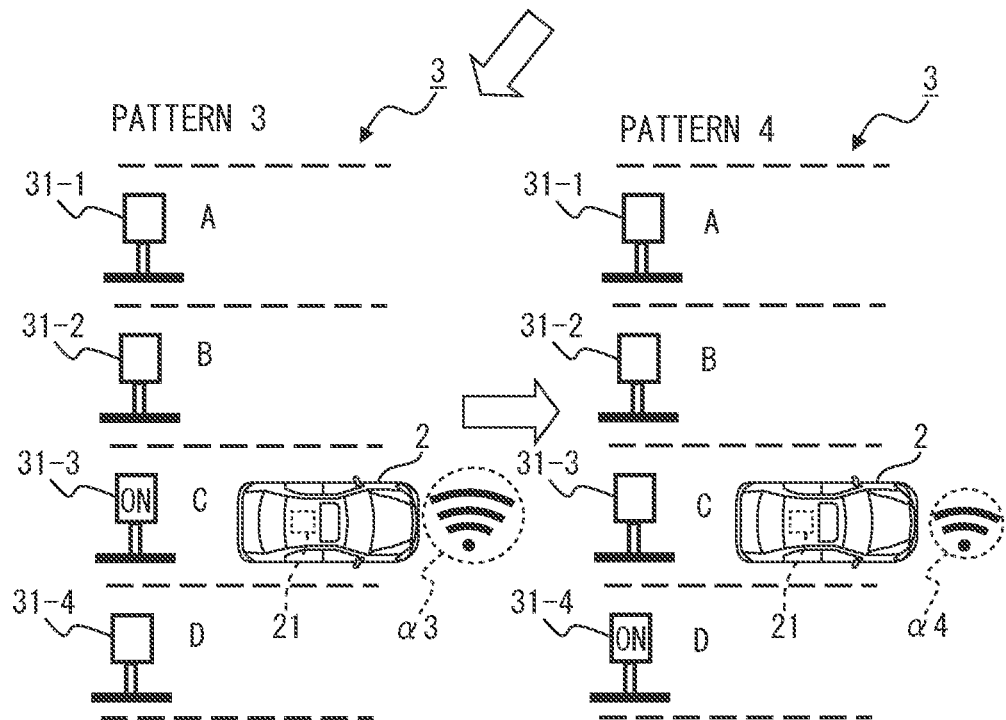

FIG. 7
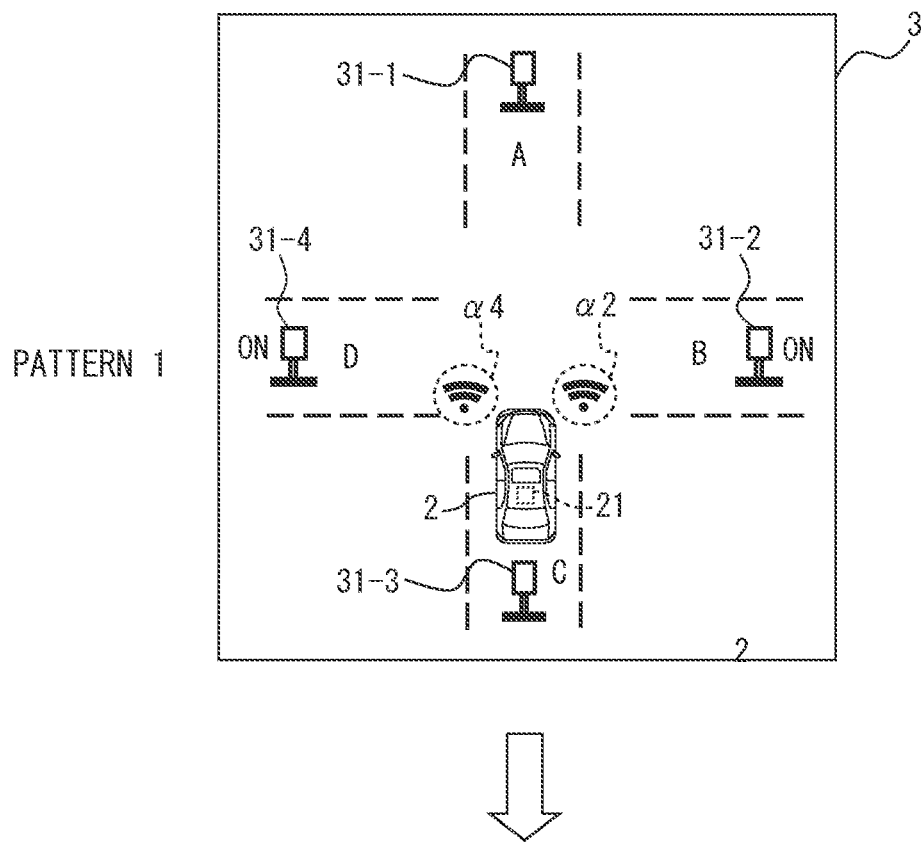
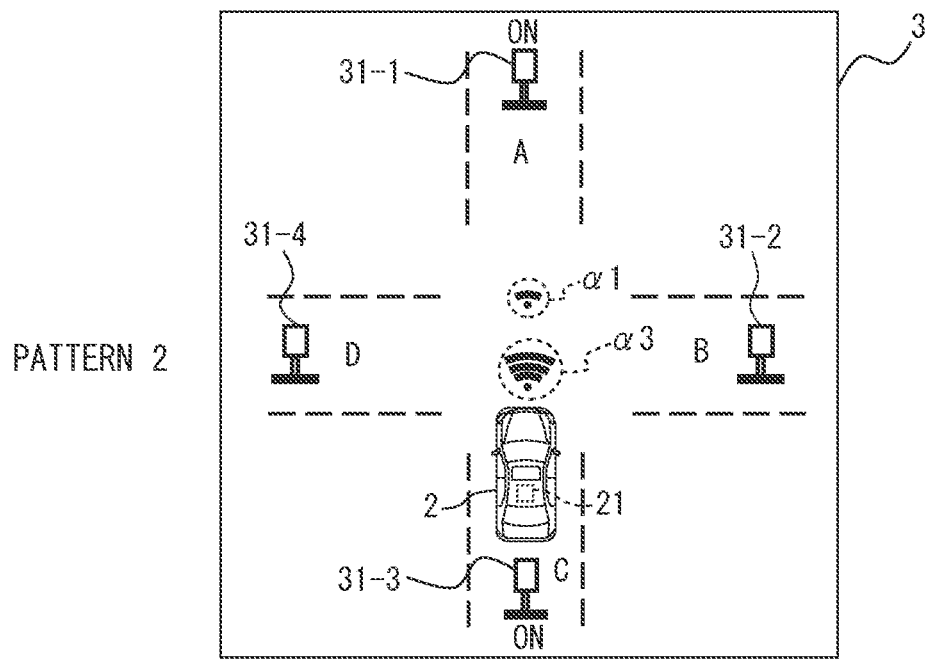

COMMUNICATION CONTROLLER

CROSS-REFERENCE TO RELATED APPLICATION

This application claims priority to Japanese Patent Application No. 2022-013200 filed Jan. 31, 2022, which is incorporated herein by reference in its entirety.

TECHNICAL FIELD

The present disclosure relates to a communication controller.

BACKGROUND

A noncontact power supply system has been conventionally known that supplies, in a noncontact manner, power to a parked vehicle from a noncontact power supply device mounted on the ground, using transmission schemes such as magnetic field coupling (electromagnetic induction), electric field coupling, magnetic field resonant coupling (magnetic field resonance), and electric field resonant coupling (electric field resonance). In such a noncontact power supply system, one of a plurality of mounted noncontact power supply devices and a vehicle are paired with each other by wireless communication, and noncontact power supply is performed between the paired noncontact power supply device and vehicle. A vehicle-mounted communication apparatus and communication method, for example, are known for pairing a given noncontact power supply device and a vehicle with each other when a query signal is sent from the vehicle to an unspecified number of noncontact power supply devices, and a response signal is received only from the given noncontact power supply device by the vehicle upon a stepwise reduction in output of sending the query signal (see, e.g., Japanese Unexamined Patent Publication (Kokai) No. 2014-017747).

When the plurality of noncontact power supply devices and the vehicle simultaneously communicate with each other in response to a query from the vehicle-mounted communication apparatus, radio frequency interference may occur, so the vehicle may be erroneously paired with a noncontact power supply device distant from it instead of being paired with a noncontact power supply device closest to it. In addition, a function for changing the directionality in the vehicle-mounted communication apparatus and sending a query signal may be used, thus incurring a higher cost.

SUMMARY

A summary of the present disclosure is as follows:
(1) A communication controller including:
an activation control unit configured to activate signal output processes of respective first communication units of a plurality of noncontact power supply devices so that signals output from the respective first communication units cause no radio frequency interference with each other; and
a pairing control unit configured to pair a vehicle with the noncontact power supply device including a first communication unit corresponding to a signal having a highest radio field intensity among the signals output from the respective first communication units and received by a second communication unit of the vehicle.

(2) The communication controller according to (1), wherein the activation control unit sequentially activates the signal output processes of the respective first communication units at different activation timings.
(3) The communication controller according to (1), wherein the activation control unit sequentially activates the signal output processes for each group of the first communication units located at positions, at which the first communication units cause no radio frequency interference with each other, at an activation timing that varies in the each group.
(4) The communication controller according to any one of (1) to (3), wherein the activation control unit activates the signal output processes of the respective first communication units to output signals having an equal radio field intensity.
(5) The communication controller according to any one of (1) to (4), wherein the activation control unit does not activate a signal output process of a first communication unit of an already paired noncontact power supply device among the first communication units.
(6) The communication controller according to any one of (1) to (5), wherein the activation control unit is provided in a charging station including the plurality of noncontact power supply devices.
(7) The communication controller according to any one of (1) to (5), wherein the activation control unit is provided in the vehicle.

BRIEF DESCRIPTION OF THE DRAWINGS

FIG. 6 is a diagram illustrating an exemplary activation pattern according to a first mode executed by an activation control unit;

FIG. 7 is a diagram (part 1) illustrating an exemplary activation pattern according to a second mode executed by the activation control unit;

DETAILED DESCRIPTION

Figure 1:
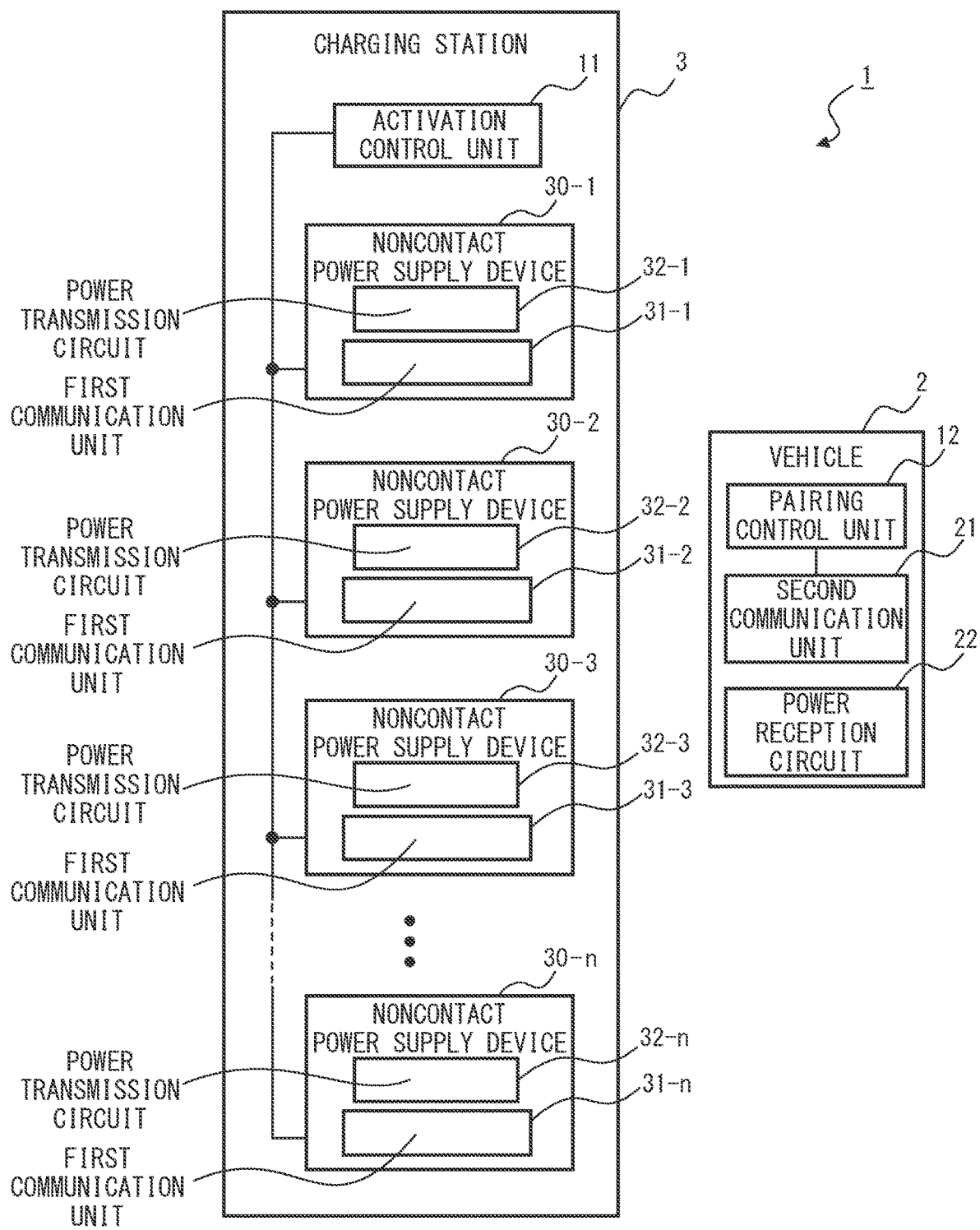
FIG. 1 is a block diagram schematically illustrating the configuration of a noncontact power supply system including a communication controller according to one embodiment of the present disclosure.

A communication controller will be described below with reference to the drawings. In the drawings, the same or similar reference numerals denote the same or similar members. To facilitate understanding, these drawings use different scales as appropriate. The modes illustrated in the drawings are merely examples for carrying out the present disclosure, which is not limited to these modes.

<Configuration of Entire Noncontact Power Supply System>

FIG. 1 is a block diagram schematically illustrating the configuration of a noncontact power supply system including a communication controller according to one embodiment of the present disclosure.

In the noncontact power supply system, noncontact power supply devices 30-1 to 30-$n$ ($n$ is a natural number of 2 or more; the same applies to the following description) are respectively provided in correspondence with parking slots for a vehicle in a charging station 3. Each of the noncontact power supply devices 30-1 to 30-$n$ includes a first communication unit and a power transmission circuit. In the example illustrated in FIG. 1, suffix numbers in reference numerals denoting first communication units and power transmission circuits are attached in correspondence with suffix numbers in reference numerals denoting noncontact power supply devices. For example, the noncontact power supply device 30-1 includes a first communication unit 31-1 and a power transmission circuit 32-1, and the noncontact power supply device 30-2 includes a first communication unit 31-2 and a power transmission circuit 32-2. Similarly, the noncontact power supply device 30-$n$ includes a first communication unit 31-$n$ and a power transmission circuit 32-$n$. Any one of the noncontact power supply devices 30-1 to 30-$n$ will be referred to as a noncontact power supply device 30 hereinafter. Similarly, any one of the first communication units 31-1 to 31-$n$ will be referred to as a first communication unit 31 hereinafter. Similarly, any one of the power transmission circuits 32-1 to 32-$n$ will be referred to as a power transmission circuit 32 hereinafter.

Signals output from the respective first communication units 31-1 to 31-$n$ will be referred to as "query signals" hereinafter. The query signals are output from the respective first communication units 31-1 to 31-$n$ at the same radio field intensity. Each of the power transmission circuits 32-1 to 32-$n$ is configured to transmit power to a paired vehicle 2 in a noncontact manner. Each of the power transmission circuits 32-1 to 32-$n$ is, for example, embedded in the ground (underground) of a corresponding parking slot.

The vehicle 2 includes a second communication unit 21, a power reception circuit 22, and a pairing control unit 12 (to be described later). The second communication unit 21 is configured to receive signals output from the respective first communication units 31-1 to 31-$n$. The power reception circuit 22 is configured to receive power from a paired noncontact power supply device 30 in a noncontact manner.

As communication between each of the first communication units 31-1 to 31-$n$ and the second communication unit 21, short-range wireless communication, for example, is used. The short-range wireless communication means communication using a communication range shorter than that used in wide-range wireless communication and, more specifically, means communication using a communication range shorter than, e.g., 10 m. As the short-range wireless communication, various types of close-range wireless communication using a short communication range can be used, and communication compliant with an arbitrary communication standard (e.g., Wi-Fi (registered trademark), Bluetooth (registered trademark), or ZigBee (registered trademark)) formulated by, e.g., IEEE, ISO, or IEC, for example, is used. As a technique for performing the short-range wireless communication, DSRC (Dedicated Short Range Communication) or RFID (Radio Frequency Identification), for example, is used.

<Configuration of Communication Controller>

One of the noncontact power supply devices 30-1 to 30-$n$ mounted in the charging station 3 and the vehicle 2 are paired with each other by a communication controller 1 according to one embodiment of the present disclosure. Noncontact power supply is performed between the paired noncontact power supply device and the vehicle 2. The communication controller 1 includes an activation control unit 11 and a pairing control unit 12.

The activation control unit 11 activates signal output processes of the respective first communication units 31-1 to 31-$n$ of the noncontact power supply devices 30-1 to 30-$n$ so that signals output from the respective first communication units 31-1 to 31-$n$ cause no radio frequency interference with each other. A first communication unit 31 (i.e., a first communication unit 31 in the ON state), the signal output process of which is activated by the activation control unit 11, outputs a query signal having a radio field intensity that takes a predetermined value, while a first communication unit 31 (i.e., a first communication unit 31 in the OFF state), the signal output process of which is not activated by the activation control unit 11, outputs no query signal. The activation control unit 11 is provided in the charging station 3 in the embodiment illustrated in FIG. 1, but it may be provided in the vehicle 2, as will be described later.

Query signals output from the respective first communication units 31-1 to 31-$n$ to cause no radio frequency interference with each other are received by the second communication unit 21 of the vehicle 2. The query signals are output from the respective first communication units 31-1 to 31-$n$ at the same radio field intensity, but the smaller the distance between the second communication unit 21 and the first communication unit 31, the higher the radio field intensity of the query signal received by the second communication unit 21. The pairing control unit 12 pairs the vehicle 2 with the noncontact power supply device 30 including a first communication unit 31 that has output a query signal having a highest radio field intensity and received by the second communication unit 21 of the vehicle 2. As the pairing method, an arbitrary method can be used as long as it allows mutual authentication, and a three-way handshake, for example, may be used.

<Configuration of Noncontact Power Supply Device>

Figure 2:
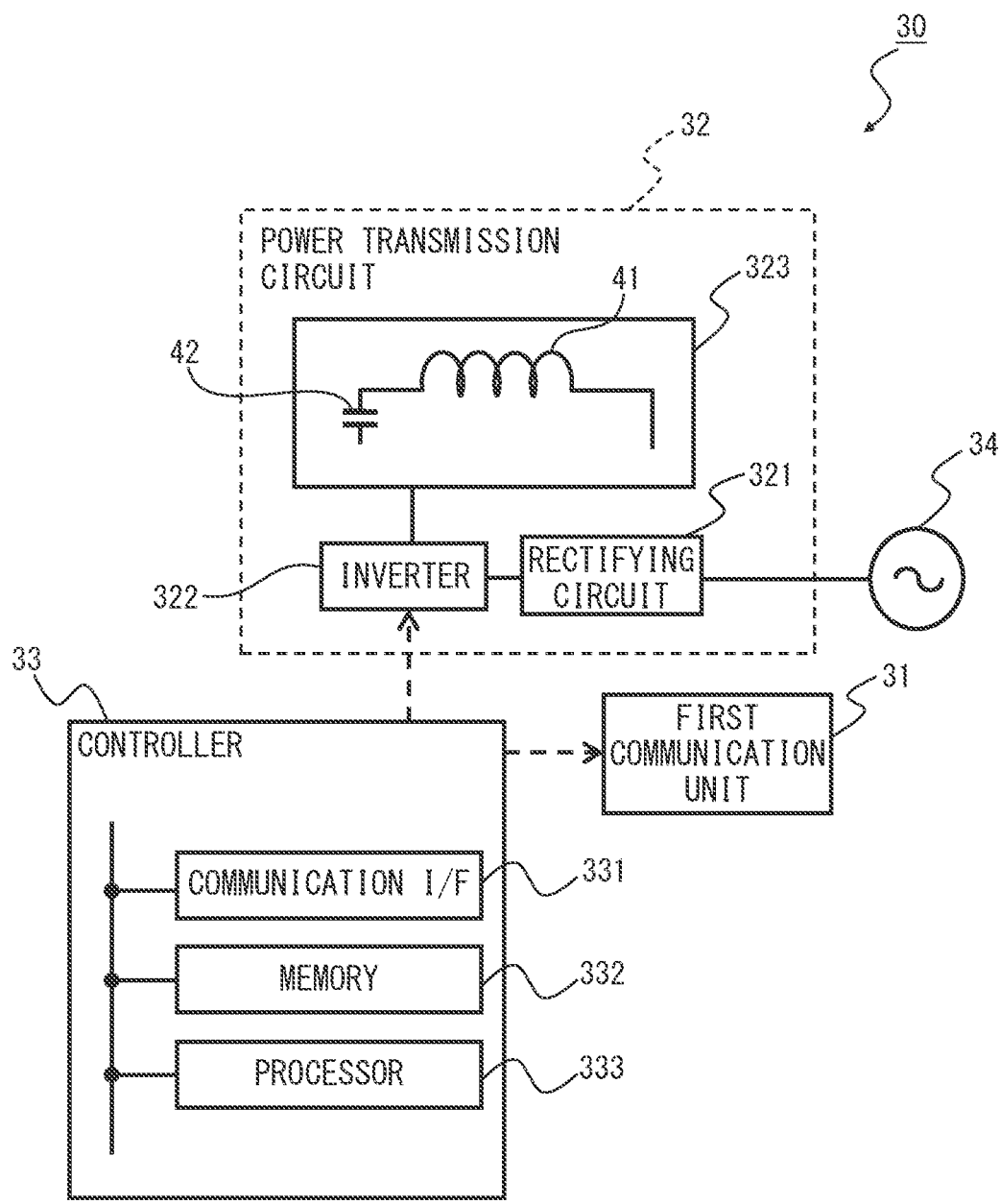
FIG. 2 is a block diagram schematically illustrating the configuration of a noncontact power supply device in the noncontact power supply system illustrated in FIG. 1.

FIG. 2 is a block diagram schematically illustrating the configuration of a noncontact power supply device in the noncontact power supply system illustrated in FIG. 1.

The noncontact power supply device 30 includes a controller 33 and a power source 34, in addition to the first communication unit 31 and the power transmission circuit 32. The controller 33 and the power source 34 may be embedded in the ground (underground) of a corresponding parking slot, or may be placed on the ground in the vicinity of this parking slot.

The power source 34 supplies power to the power transmission circuit 32. The power source 34 is implemented as, e.g., a commercial AC power source that supplies singlephase AC power. The power source 34 may be implemented as other AC power sources that supply three-phase AC power, or may be implemented as a DC power source such as a fuel cell or a photovoltaic power generator. In addition, the power source 34 may be individually provided in each of the noncontact power supply devices 30-1 to 30-n, or may be shared among the noncontact power supply devices 30-1 to 30-n.

The power transmission circuit 32 transmits the power supplied from the power source 34 to the vehicle 2. The power transmission circuit 32 includes a rectifying circuit 321, an inverter 322, and a power transmission resonance circuit 323. In the power transmission circuit 32, AC power supplied from the power source 34 is rectified and converted into a direct current by the rectifying circuit 321, the direct current is converted into AC power by the inverter 322, and the AC power is supplied to the power transmission resonance circuit 323.

The rectifying circuit 321 is electrically connected to the power source 34 and the inverter 322. The rectifying circuit 321 rectifies and converts AC power supplied from the power source 34 into DC power, and supplies the DC power to the inverter 322. The rectifying circuit 321 is implemented as, e.g., an AC/DC converter. When the power source 34 is designed as a DC power source, the rectifying circuit 321 may be omitted.

The inverter 322 is electrically connected to the rectifying circuit 321 and the power transmission resonance circuit 323. The inverter 322 converts the DC power supplied from the rectifying circuit 321 into AC power (high-frequency power) having a frequency higher than that of the AC power from the power source 34, and supplies the high-frequency power to the power transmission resonance circuit 323.

The power transmission resonance circuit 323 includes a resonator formed by a coil 41 and a capacitor 42. Various parameters of the coil 41 and the capacitor 42 (e.g., the outer diameter and the inner diameter of the coil 41, the number of turns of the coil 41, and the electrostatic capacitance of the capacitor 42) are specified to set the resonance frequency of the power transmission resonance circuit 323 to a predetermined setting value. In some embodiments, the predetermined setting value is set to, e.g., 10 kHz to 100 GHz or to 85 kHz established by SAE TIR J2954 standard as the frequency range for noncontact power transmission. When the high-frequency power supplied from the inverter 322 is applied to the power transmission resonance circuit 323, the power transmission resonance circuit 323 generates an AC magnetic field for power transmission.

The controller 33 is implemented as, e.g., a general-purpose computer, and performs various types of control of the noncontact power supply device 30. The controller 33, for example, is electrically connected to the inverter 322 of the power transmission circuit 32, and controls the inverter 322 to control power transmission by the power transmission circuit 32. The controller 33 further controls the first communication unit 31 under the control of the activation control unit 11.

The controller 33 includes a communication interface 331, a memory 332, and a processor 333. The communication interface 331, the memory 332, and the processor 333 are electrically connected to each other via a bus.

The communication interface 331 includes an interface circuit for electrically connecting the controller 33 to various devices (e.g., the inverter 322, the first communication unit 31, and the activation control unit 11) constituting the noncontact power supply device 30. The controller 33 communicates with other devices via the communication interface 331.

The memory 332 includes, e.g., a volatile semiconductor memory (e.g., a RAM) and a nonvolatile semiconductor memory (e.g., a ROM). The memory 332 stores, e.g., computer programs for performing various types of processing by the processor 333, and various data used to perform various types of processing by the processor 333.

The processor 333 includes one or more CPUs (Central Processing Units) and their peripheral circuits. The processor 333 may further include an arithmetic circuit such as a logical arithmetic unit or a numerical arithmetic unit. The processor 333 performs various types of processing, based on the computer programs stored in the memory 332.

<Configuration of Vehicle>

Figure 3:
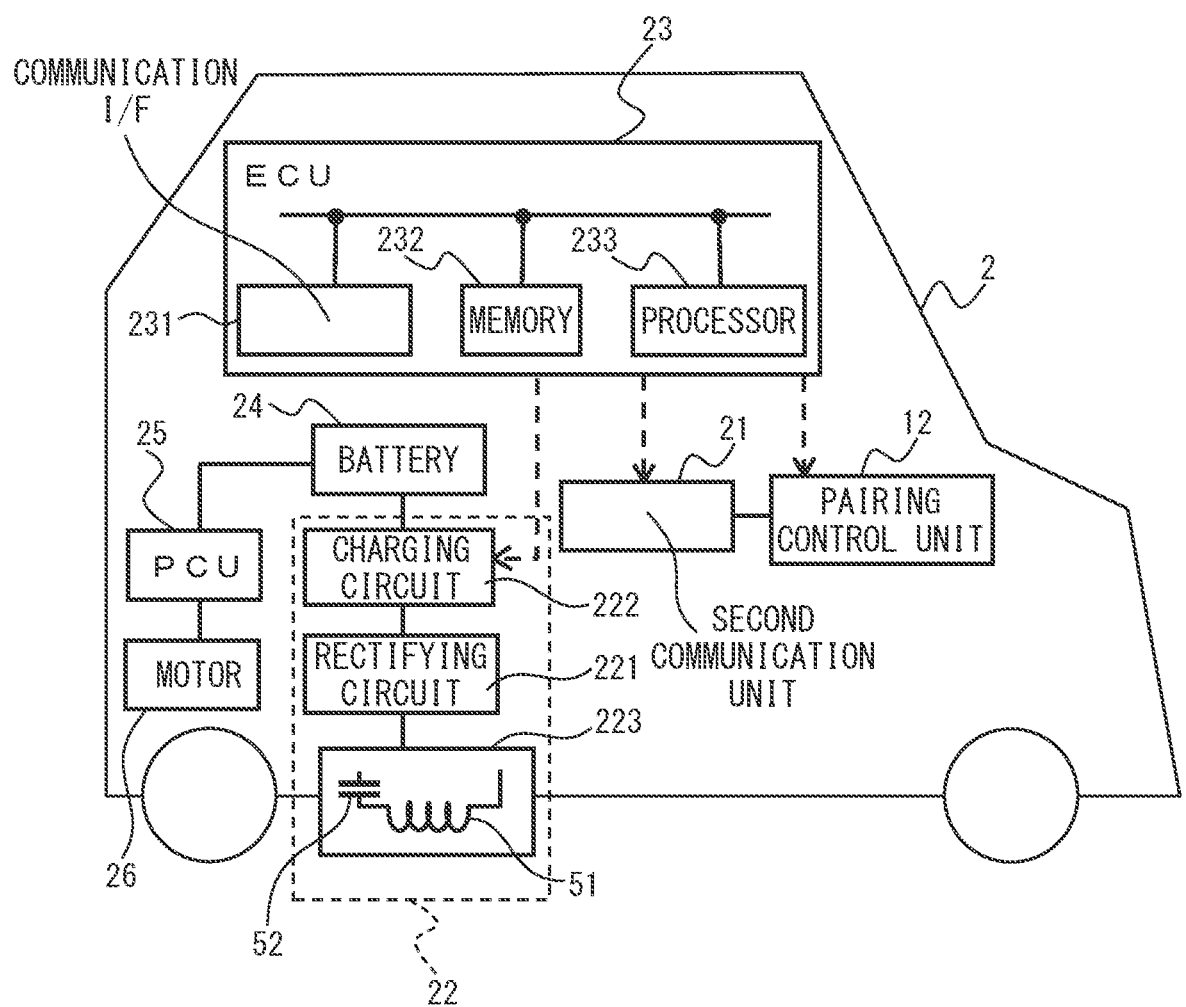
FIG. 3 is a block diagram schematically illustrating the configuration of a vehicle in the noncontact power supply system illustrated in FIG. 1.

FIG. 3 is a block diagram schematically illustrating the configuration of a vehicle in the noncontact power supply system illustrated in FIG. 1.

The vehicle 2 includes an electronic control unit (ECU) 23, a battery 24, a power control unit (PCU) 25, and a motor 26, in addition to the second communication unit 21, the power reception circuit 22, and the pairing control unit 12. In this embodiment, the vehicle 2 is implemented as a battery electric vehicle (BEV) in which the motor 26 drives the vehicle 2. The vehicle 2, however, may be implemented as a hybrid electric vehicle (HEV) or a plug-in hybrid electric vehicle (PHEV) in which not only the motor 26 but also an internal combustion engine drives the vehicle 2.

The battery 24 serves as a rechargeable secondary battery, and is implemented as, e.g., a lithium-ion battery or a nickel-hydride battery. The battery 24 stores power (e.g., drive power for the motor 26) involved in traveling of the vehicle 2. When power received from the power transmission circuit 32 by the power reception circuit 22 is supplied to the battery 24, the battery 24 is charged. When regenerative power generated by the motor 26 is supplied to the battery 24, the battery 24 is charged. Upon charging of the battery 24, the SOC (State Of Charge) of the battery 24 is restored. The battery 24 may be allowed to be charged even by an external power source other than the noncontact power supply device 30 through a charging port provided in the vehicle 2.

The motor 26 is implemented as, e.g., an AC synchronous motor, and functions as an electric motor and an electric generator. When the motor 26 functions as an electric motor, it is driven using the power stored in the battery 24 as a source of power. The output from the motor 26 is transmitted to a wheel of the vehicle 2 through a reduction gear and an axle shaft. In deceleration of the vehicle 2, the motor 26 is driven by rotation of the wheel and functions as an electric generator to generate regenerative power.

The PCU 25 is electrically connected to the battery 24 and the motor 26. The PCU 25 includes an inverter, a boost converter, and a DC/DC converter. The inverter converts DC power supplied from the battery 24 into AC power and supplies the AC power to the motor 26. The inverter, however, converts AC power (regenerative power) generated by the motor 26 into DC power and supplies the DC power to the battery 24. The boost converter raises the voltage of the battery 24 as appropriate when the power stored in the battery 24 is supplied to the motor 26. The DC/DC converter lowers the voltage of the battery 24 when the power stored in the battery 24 is supplied to an electronic device such as a headlight.

The power reception circuit 22 receives power from the power transmission circuit 32 of the paired noncontact power supply device 30 and supplies the received power to the battery 24. The power reception circuit 22 includes a rectifying circuit 221, a charging circuit 222, and a power reception resonance circuit 223.

The power reception resonance circuit 223 is placed at the bottom of the vehicle 2 to have a small distance from the ground. The power reception resonance circuit 223 has a configuration similar to that of the power transmission resonance circuit 323, and includes a resonator formed by a coil 51 and a capacitor 52. Various parameters of the coil 51 and the capacitor 52 (e.g., the outer diameter and the inner diameter of the coil 51, the number of turns of the coil 51, and the electrostatic capacitance of the capacitor 52) are specified to set the resonance frequency of the power reception resonance circuit 223 equal to that of the power transmission resonance circuit 323. In some embodiments, as long as the amount of shift between the resonance frequency of the power reception resonance circuit 223 and that of the power transmission resonance circuit 323 is small, and, for example, as long as the resonance frequency of the power reception resonance circuit 223 falls within the range of ±20% of the resonance frequency of the power transmission resonance circuit 323, the resonance frequency of the power reception resonance circuit 223 may not always be set equal to that of the power transmission resonance circuit 323.

With the power reception resonance circuit 223 facing the power transmission resonance circuit 323, when an AC magnetic field is generated by the power transmission resonance circuit 323, oscillation of the AC magnetic field is transmitted to the power reception resonance circuit 223 that resonates at the same resonance frequency as that of the power transmission resonance circuit 323. As a result, an induced current flows through the power reception resonance circuit 223 by electromagnetic induction and thus produces an induced electromotive force in the power reception resonance circuit 223. In other words, the power transmission resonance circuit 323 transmits power to the power reception resonance circuit 223, and the power reception resonance circuit 223 receives the power from the power transmission resonance circuit 323.

The rectifying circuit 221 is electrically connected to the charging circuit 222 and the power reception resonance circuit 223. The rectifying circuit 221 rectifies and converts AC power supplied from the power reception resonance circuit 223 into DC power, and supplies the DC power to the charging circuit 222. The rectifying circuit 221 is implemented as, e.g., an AC/DC converter.

The charging circuit 222 is electrically connected to the rectifying circuit 221 and the battery 24. The charging circuit 222 converts the DC power supplied from the rectifying circuit 221 into a voltage level of the battery 24 and supplies the voltage level to the battery 24. When the power transmitted from the power transmission circuit 32 is supplied to the battery 24 by the power reception circuit 22, the battery 24 is charged. The charging circuit 222 is implemented as, e.g., a DC/DC converter.

The ECU 23 performs various types of control of the vehicle 2. The ECU 23, for example, is electrically connected to the charging circuit 222 of the power reception circuit 22, and controls the charging circuit 222 to control charging of the battery 24 by the power transmitted from the power transmission circuit 32. The ECU 23 is further electrically connected to the PCU 25, and controls the PCU 25 to control power exchange between the battery 24 and the motor 26. The ECU 23 further controls the second communication unit 21 and the pairing control unit 12.

The ECU 23 includes a communication interface 231, a memory 232, and a processor 233. The communication interface 231, the memory 232, and the processor 233 are connected to each other via a signal line.

The communication interface 231 includes an interface circuit for connecting the ECU 23 to an in-vehicle network compliant with a standard such as CAN (Controller Area Network). The ECU 23 communicates with other devices via the communication interface 231.

The memory 232 includes, e.g., a volatile semiconductor memory (e.g., a RAM) and a nonvolatile semiconductor memory (e.g., a ROM). The memory 232 stores, e.g., computer programs for performing various types of processing by the processor 233, and various data used to perform various types of processing by the processor 233.

The processor 233 includes one or more CPUs (Central Processing Units) and their peripheral circuits. The processor 233 may further include an arithmetic circuit such as a logical arithmetic unit or a numerical arithmetic unit. The processor 233 performs various types of processing, based on the computer programs stored in the memory 232.

<Operation of Communication Controller>

Figure 4:
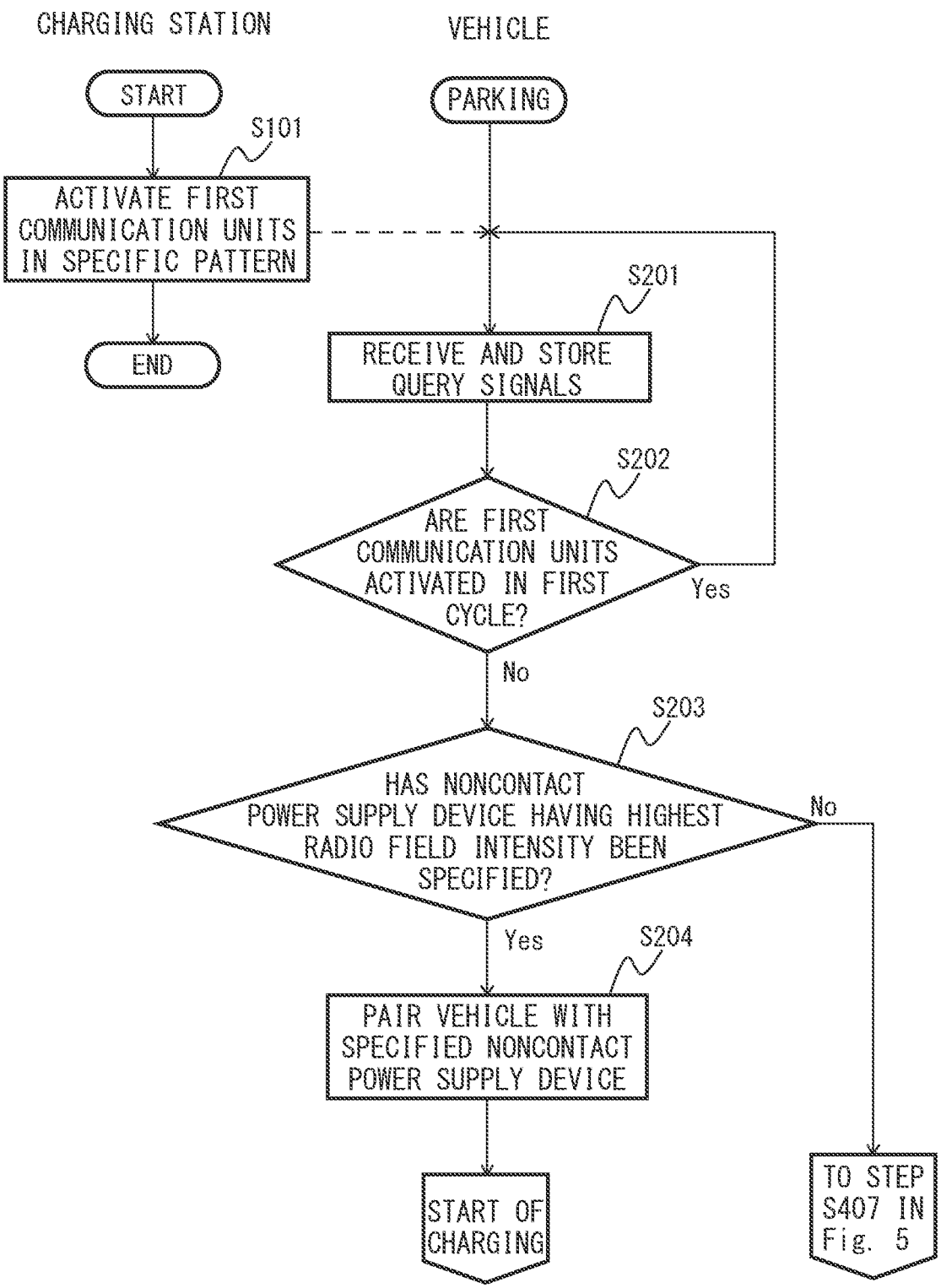
FIG. 4 is a flowchart illustrating the operation sequence of the communication controller according to the embodiment of the present disclosure.

FIG. 4 is a flowchart illustrating the operation sequence of the communication controller according to the embodiment of the present disclosure.

First, a user (driver) parks the vehicle 2 in one of a plurality of parking slots provided in the charging station 3. Then, when the user (the driver or any passenger) riding in the vehicle 2, for example, instructs the communication controller 1 to start its operation by operating a predetermined operation button provided in the vehicle 2, a start signal is sent to the activation control unit 11 in the charging station 3 via the second communication unit 21 provided in the vehicle 2 or other communication units. Upon receiving the start signal, in step S101 the activation control unit 11 activates signal output processes of the respective first communication units 31-1 to 31-n of the noncontact power supply devices 30-1 to 30-n in a specific activation pattern so that signals output from the respective first communication units 31-1 to 31-n cause no radio frequency interference with each other. The specific activation pattern means a combination of a first communication unit 31, the signal output process of which is activated at a certain point of time, and a first communication unit 31, the signal output process of which is not activated at the certain point of time.

As an alternative example to this, in the state in which the activation control unit 11 has already activated signal output processes of the respective first communication units 31-1 to 31-n in a specific activation pattern in step S101, the user (the driver or any passenger) riding in the vehicle 2 may start the process (reception and storage of query signals) in step S201 by operating a predetermined operation button provided in the vehicle 2.

In step S101, a first communication unit 31 (i.e., a first communication unit 31 in the ON state), the signal output process of which is activated by the activation control unit 11, outputs a query signal, while a first communication unit 31 (i.e., a first communication unit 31 in the OFF state), the signal output process of which is not activated by the activation control unit 11, outputs no query signal. The query signals are output from the respective first communication units 31-1 to 31-n at the same radio field intensity.

An already paired noncontact power supply device 30 has already been used for noncontact power supply of another vehicle 2. In step S101, therefore, the activation control unit 11 does not activate any signal output process of the first communication unit 31 of the already paired noncontact power supply device 30 among the first communication units 31-1 to 31-n. The activation control unit 11 activates signal output processes at least once for all the first communication units 31 of noncontact power supply devices 30 remaining to be paired among the first communication units 31-1 to 31-n.

Several modes of the activation pattern of the first communication units 31-1 to 31-n by the activation control unit 11 will be enumerated herein.

In an activation pattern according to a first mode, the activation control unit 11 sequentially activates signal output processes of the respective first communication units 31-1 to 31-n at different activation timings. Setting different activation timings for the signal output processes of the respective first communication units 31-1 to 31-n makes it possible to prevent query signals output from the respective first communication units 31-1 to 31-n from causing radio frequency interference with each other.

FIG. 6 is a diagram illustrating an exemplary activation pattern according to a first mode executed by an activation control unit. FIG. 6 does not illustrate configurations associated with power transmission and power reception. Referring to FIG. 6, as one example, the vehicle 2 is parked in a parking slot C among four parking slots A to D aligned in the charging station 3. The noncontact power supply device 30-1 including the first communication unit 31-1 is provided in the parking slot A, the noncontact power supply device 30-2 including the first communication unit 31-2 is provided in the parking slot B, the noncontact power supply device 30-3 including the first communication unit 31-3 is provided in the parking slot C, and the noncontact power supply device 30-4 including the first communication unit 31-4 is provided in the parking slot D.

The activation control unit 11 activates the first communication units 31 in the order of, e.g., patterns 1 to 4, as illustrated in FIG. 6. Each of patterns 1 to 4 is executed at least once, but these patterns are not executed to temporally overlap each other. In pattern 1, the activation control unit 11 activates (turns on) the first communication unit 31-1 located in the parking slot A, and does not activate the first communication units 31-2, 31-3, and 31-4. In pattern 2, the activation control unit 11 activates (turns on) the first communication unit 31-2 located in the parking slot B, and does not activate the first communication units 31-1, 31-3, and 31-4. In pattern 3, the activation control unit 11 activates (turns on) the first communication unit 31-3 located in the parking slot C, and does not activate the first communication units 31-1, 31-2, and 31-4. In pattern 4, the activation control unit 11 activates (turns on) the first communication unit 31-4 located in the parking slot D, and does not activate the first communication units 31-1, 31-2, and 31-3. In this manner, signal output processes are activated at least once for all the first communication units 31-1 to 31-4, except the first communication unit 31 of an already paired noncontact power supply device 30. The order of execution of patterns 1 to 4 illustrated in FIG. 6 is merely an example, and in some embodiments, these patterns may not always be executed in this order. For example, pattern 3 may be executed first, pattern 1 may be executed second, pattern 4 may be executed third, and pattern 2 may be executed fourth. As another example, pattern 4 may be executed first, pattern 3 may be executed second, pattern 2 may be executed third, and pattern 1 may be executed fourth. As still another example, patterns 1 to 4 may be executed in an order other than the above-mentioned examples.

In an activation pattern according to a second mode, some of the first communication units 31 located at positions at which they cause no radio frequency interference with each other are activated simultaneously. In other words, in the activation pattern according to the second mode, the activation control unit 11 sequentially activates signal output processes for each group of the first communication units 31 located at positions, at which they cause no radio frequency interference with each other, at an activation timing that varies in each individual group. Query signals output from the respective first communication units 31-1 to 31-n can be prevented from causing radio frequency interference with each other by keeping the first communication units 31 from causing radio frequency interference with each other in the same group, and setting different activation timings for the signal output processes of the first communication units 31 between different groups. In the activation pattern according to the second mode, further, since signal output processes of a plurality of first communication units 31 are activated simultaneously, activation of signal output processes of all the first communication units 31 can be completed in a shorter period of time than in the activation pattern according to the first mode. Hence, the larger the number of first communication units 31 (i.e., the larger the number of noncontact power supply devices 30), the greater the effect exerted by the activation pattern according to the second mode in terms of shortening the processing time.

FIG. 7 is a diagram (part 1) illustrating an exemplary activation pattern according to a second mode executed by the activation control unit. FIG. 7 does not illustrate configurations associated with power transmission and power reception. Referring to FIG. 7, as one example, the vehicle 2 is parked in a parking slot C among four parking slots A to D arranged in a cross shape in the charging station 3. The noncontact power supply device 30-1 including the first communication unit 31-1 is provided in the parking slot A, the noncontact power supply device 30-2 including the first communication unit 31-2 is provided in the parking slot B, the noncontact power supply device 30-3 including the first communication unit 31-3 is provided in the parking slot C, and the noncontact power supply device 30-4 including the first communication unit 31-4 is provided in the parking slot D. The first communication units 31-1 and 31-3 are located at positions at which query signals output from the respective first communication units 31-1 and 31-3 cause no radio frequency interference with each other. The first communication units 31-2 and 31-4 are located at positions at which query signals output from the respective first communication units 31-2 and 31-4 cause no radio frequency interference with each other. In contrast to this, radio frequency interference occurs between the first communication units 31-1 and 31-2, between the first communication units 31-2 and 31-3, between the first communication units 31-3 and 31-4, and between the first communication units 31-4 and 31-1.

The activation control unit 11 activates the first communication units 31 in the order of, e.g., pattern 1 to pattern 2, as illustrated in FIG. 7. Each of patterns 1 and 2 is executed at least once, but these patterns are not executed to temporally overlap each other. In pattern 1, the activation control unit 11 activates (turns on) a group of the first communication units 31-2 and 31-4 located at positions at which they cause no radio frequency interference with each other, but it does not activate a group of the first communication units 31-1 and 31-3. In pattern 2, the activation control unit 11 activates (turns on) the group of the first communication units 31-1 and 31-3 located at positions at which they cause no radio frequency interference with each other, but it does not activate the group of the first communication units 31-2 and 31-4. In this manner, the group formed by the first communication units 31-2 and 31-4 (pattern 1) and the group formed by the first communication units 31-1 and 31-3 (pattern 2) are sequentially activated without temporally overlapping each other. Since each of the first communication units 31-1 to 31-4 belongs to one of these groups, signal output processes are activated at least once for all the first communication units 31-1 to 31-4, except the first communication unit 31 of an already paired noncontact power supply device 30. The order of execution of pattern 1 to pattern 2 illustrated in FIG. 7 is merely an example, and, for example, pattern 2 may be executed first, and then pattern 1 may be executed.

Figure 8:
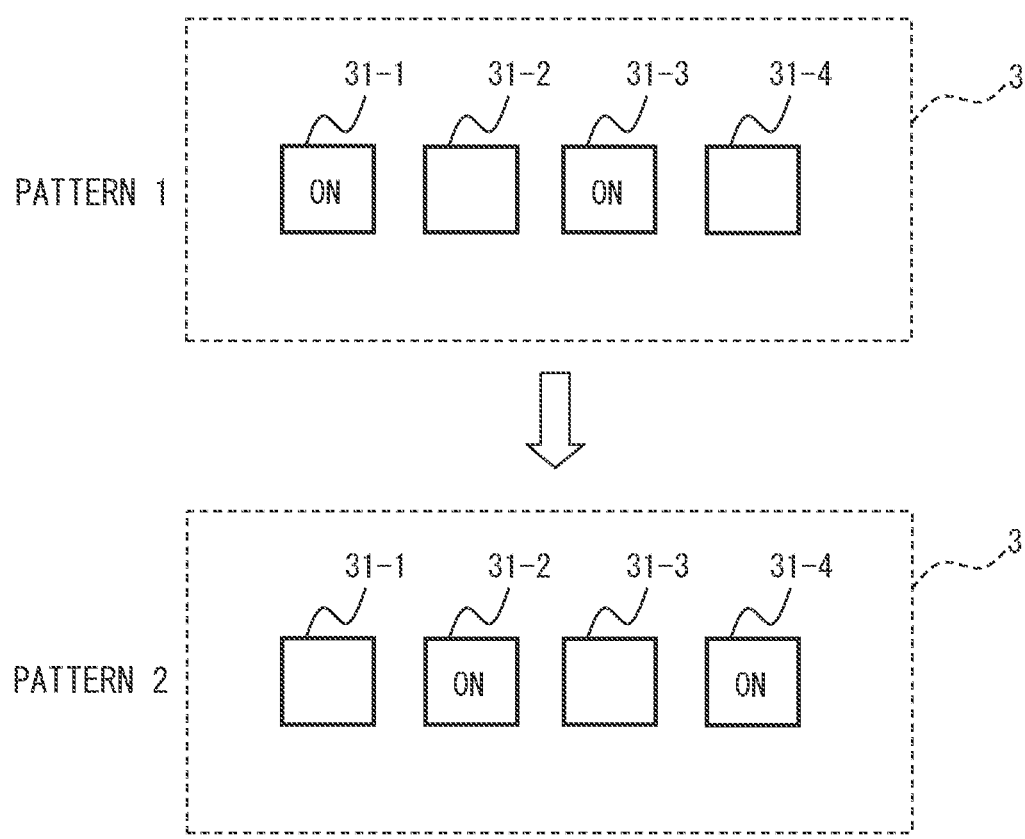
FIG. 8 is a diagram (part 2) illustrating another exemplary activation pattern according to the second mode executed by the activation control unit.

FIG. 8 is a diagram (part 2) illustrating another exemplary activation pattern according to the second mode executed by the activation control unit. FIG. 8 does not illustrate configurations associated with power transmission and power reception, and parking slots. Referring to FIG. 8, as one example, the first communication units 31-1, 31-2, 31-3, and 31-4 are respectively provided in four parking slots aligned in the charging station 3. The first communication units 31-1 and 31-3 are located at positions at which query signals output from the respective first communication units 31-1 and 31-3 cause no radio frequency interference with each other. The first communication units 31-2 and 31-4 are located at positions at which query signals output from the respective first communication units 31-2 and 31-4 cause no radio frequency interference with each other. In contrast to this, radio frequency interference occurs between the first communication units 31-1 and 31-2, between the first communication units 31-2 and 31-3, and between the first communication units 31-3 and 31-4.

The activation control unit 11 activates the first communication units 31 in the order of, e.g., pattern 1 to pattern 2, as illustrated in FIG. 8. Each of patterns 1 and 2 is executed at least once, but these patterns are not executed to temporally overlap each other. In pattern 1, the activation control unit 11 activates (turns on) a group of the first communication units 31-1 and 31-3 located at positions at which they cause no radio frequency interference with each other, but it does not activate the first communication units 31-2 and 31-4. In pattern 2, the activation control unit 11 activates (turns on) a group of the first communication units 31-2 and 31-4 located at positions at which they cause no radio frequency interference with each other, but it does not activate the first communication units 31-1 and 31-3. In this manner, the group formed by the first communication units 31-1 and 31-3 (pattern 1) and the group formed by the first communication units 31-2 and 31-4 (pattern 2) are sequentially activated without temporally overlapping each other. Since each of the first communication units 31-1 to 31-4 belongs to one of these groups, signal output processes are activated at least once for all the first communication units 31-1 to 31-4, except the first communication unit 31 of an already paired noncontact power supply device 30. The order of execution of pattern 1 to pattern 2 illustrated in FIG. 8 is merely an example, and, for example, pattern 2 may be executed first, and then pattern 1 may be executed.

Figure 9:
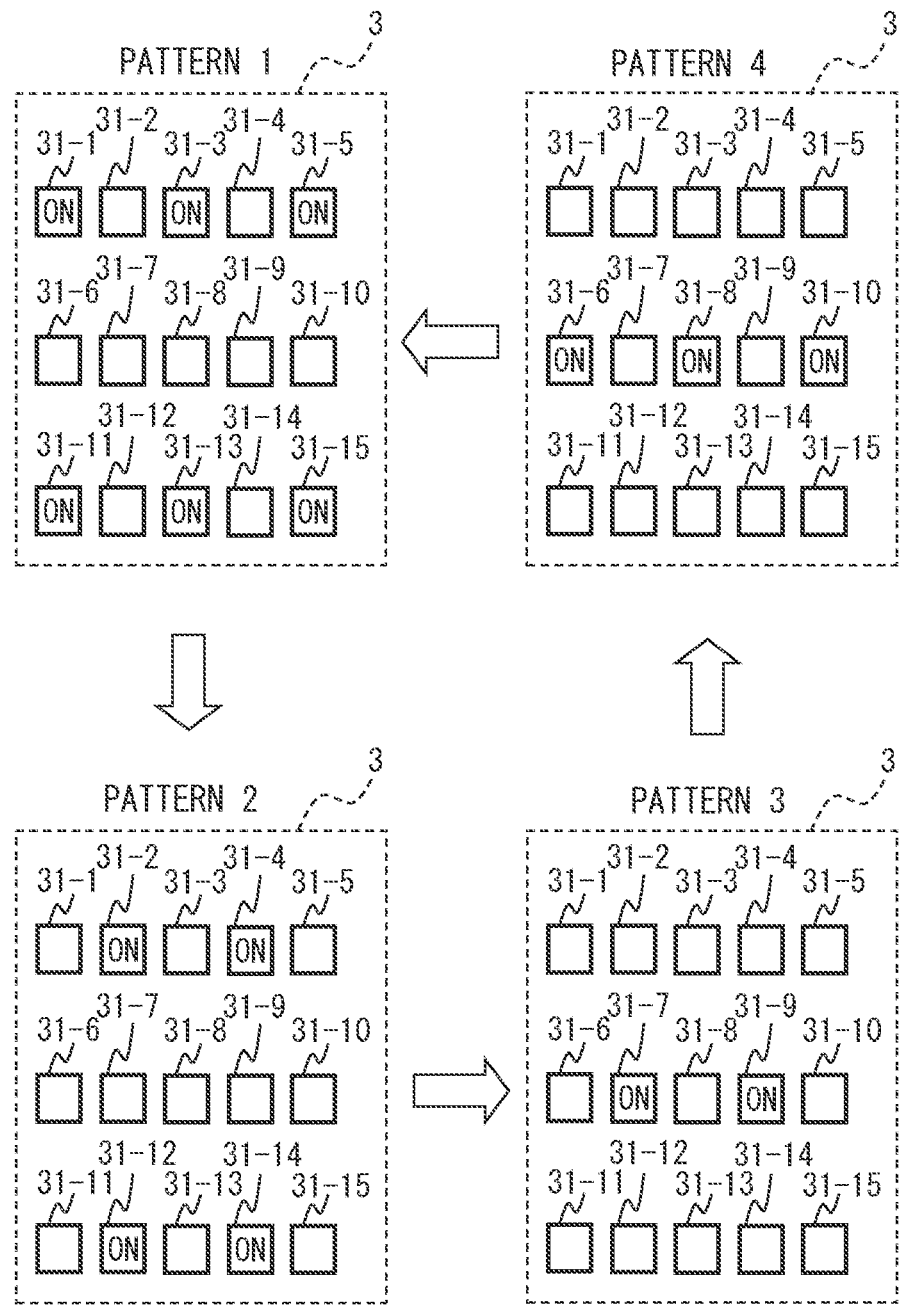
FIG. 9 is a diagram (part 3) illustrating still another exemplary activation pattern according to the second mode executed by the activation control unit.

FIG. 9 is a diagram (part 3) illustrating still another exemplary activation pattern according to the second mode executed by the activation control unit. FIG. 9 does not illustrate configurations associated with power transmission and power reception, and parking slots. Referring to FIG. 9, as one example, the first communication units 31-1 to 31-15 are respectively provided in 15 parking slots arranged in a 3 (rows)×5 (columns) matrix in the charging station 3. Each of the first communication units 31-1 to 31-15 is provided at a position at which radio frequency interference occurs between a plurality of first communication units 31 located at positions adjacent to the former first communication unit in the vertical, horizontal, and diagonal directions. The first communication unit 31-8, for example, causes radio frequency interference with the first communication units 31-2 to 31-4, 31-7, 31-9, and 31-12 to 31-14. The first communication unit 31-8, however, causes no radio frequency interference with the first communication units 31-1, 31-5, 31-6, 31-10, 31-11, and 31-15 that are not adjacent to the first communication unit 31-8.

The activation control unit 11 activates the first communication units 31 in the order of, e.g., patterns 1 to 4, as illustrated in FIG. 9. Each of patterns 1 to 4 is executed at least once, but these patterns are not executed to temporally overlap each other. In pattern 1, the activation control unit 11 activates (turns on) a group of the first communication units 31-1, 31-3, 31-5, 31-11, 31-13, and 31-15 located at positions at which they cause no radio frequency interference with each other, but it does not activate the first communication units 31-2, 31-4, 31-6 to 31-10, 31-12, and 31-14. In pattern 2, the activation control unit 11 activates (turns on) a group of the first communication units 31-2, 31-4, 31-12, and 31-14 located at positions at which they cause no radio frequency interference with each other, but it does not activate the first communication units 31-1, 31-3, 31-5, 31-6 to 31-11, 31-13, and 31-15. In pattern 3, the activation control unit 11 activates (turns on) a group of the first communication units 31-7 and 31-9 located at positions at which they cause no radio frequency interference with each other, but it does not activate the first communication units 31-1 to 31-6, 31-8, and 31-10 to 31-15. In pattern 4, the activation control unit 11 activates (turns on) a group of the first communication units 31-6, 31-8, and 31-10 located at positions at which they cause no radio frequency interference with each other, but it does not activate the first communication units 31-1 to 31-5, 31-7, 31-9, and 31-11 to 31-15. In this manner, the group formed by the first communication units 31-1, 31-3, 31-5, 31-11, 31-13, and 31-15 (pattern 1), the group formed by the first communication units 31-2, 31-4, 31-12, and 31-14 (pattern 2), the group formed by the first communication units 31-7 and 31-9 (pattern 3), and the group formed by the first communication units 31-6, 31-8, and 31-10 (pattern 4) are sequentially activated without temporally overlapping each other. Since each of the first communication units 31-1 to 31-15 belongs to one of these groups, signal output processes are activated at least once for all the first communication units 31-1 to 31-15, except the first communication unit 31 of an already paired noncontact power supply device 30. The order of execution of patterns 1 to 4 illustrated in FIG. 9 is merely an example, and in some embodiments these patterns may not always be executed in this order. For example, pattern 3 may be executed first, pattern 1 may be executed second, pattern 4 may be executed third, and pattern 2 may be executed fourth. As another example, pattern 4 may be executed first, pattern 3 may be executed second, pattern 2 may be executed third, and pattern 1 may be executed fourth. As still another example, patterns 1 to 4 may be executed in an order other than the above-mentioned examples. In addition, the combination of activation and nonactivation of the first communication units 31-1 to 31-15 specified in each of patterns 1 to 4 illustrated in FIG. 9 is merely an example, and in some embodiments, the combination of activation and nonactivation may not always be used, as illustrated in FIG. 9, in each pattern.

The arrangements of the first communication units 31 (the arrangements of the parking slots) in the charging station 3 illustrated in FIGS. 7 to 9 are merely examples, and the activation pattern according to the second mode is applicable even to other arrangement examples.

In this manner, since signal output processes of the respective first communication units 31-1 to 31-$n$ are activated in the activation pattern according to the first mode or the second mode, query signals output from the respective first communication units 31-1 to 31-$n$ can be prevented from causing radio frequency interference with each other. Hence, any vehicle 2 can be prevented from being erroneously paired with a noncontact power supply device 30 distant from the vehicle 2, instead of being paired with a noncontact power supply device 30 closest to the vehicle 2.

Referring back to FIG. 4, in step S101 of FIG. 4, the first communication unit 31 that outputs a query signal is switched every time the activation pattern is switched, while in step S201, the second communication unit 21 of the vehicle 2 receives a query signal every time the activation pattern is switched, and stores the radio field intensity of the received query signal in a storage unit (e.g., the memory 232 illustrated in FIG. 3) in the vehicle 2. The radio field intensity of the query signal is stored in the storage unit in association with identification information of the noncontact power supply device 30 including the first communication unit 31 that has output this query signal.

Several methods for identifying the noncontact power supply device 30 including the first communication unit 31 that has output a query signal will be enumerated herein.

As a first identification method, data associated with identification information for the noncontact power supply device 30 including the first communication unit 31 that has output a query signal is included in the query signal output from the first communication unit 31. In this case, the ECU 23 in the vehicle 2 extracts the data associated with the identification information included in the query signal received by the second communication unit 21, and stores the radio field intensity of the query signal in the storage unit in association with the identification information.

As a second identification method, in outputting a query signal from the first communication unit 31, data associated with identification information for the noncontact power supply device 30 including the first communication unit 31 that has output the query signal is sent by wireless communication (e.g., wide-range wireless communication) using a path different from that used for the query signal. In this case, the noncontact power supply device 30 is equipped with a communication unit for wide-range wireless communication different from the first communication unit 31. Similarly, the vehicle 2 is equipped with a communication unit for wide-range wireless communication different from the second communication unit 21. The ECU 23 in the vehicle 2 extracts the identification information included in the data received via wide-range wireless communication, and stores the radio field intensity of the query signal in the storage unit in association with the identification information. The wide-range wireless communication means communication using a communication range longer than that used in short-range wireless communication and, more specifically, means communication using a communication range of, e.g., 10 m to 10 km. As the wide-range wireless communication, various types of wireless communication using a long communication range can be used, and communication compliant with an arbitrary communication standard such as 4G, LTE, 5G, or WiMAX formulated by 3GPP or IEEE, for example, is used.

As a third identification method, the activation patterns of the first communication units 31-1 to 31-$n$ and the order of execution of these activation patterns are held in advance by the ECU 23 in the vehicle 2, and identification information is held by matching the switching period of the activation pattern with the period of reception (the period of sampling) by the second communication unit 21 under the control of the ECU 23 in the vehicle 2. Since the switching period of the activation pattern and the period of reception by the second communication unit 21 match each other, and the ECU 23 holds the activation patterns of the first communication units 31-1 to 31-$n$ and the order of execution of these activation patterns, the ECU 23 can store the radio field intensity of the received query signal in the storage unit together with the identification information of the first communication unit 31 that has output this query signal.

In step S201 of FIG. 4, the radio field intensity of the received query signal and the identification information of the noncontact power supply device 30 including the first communication unit 31 that has output this query signal are associated with each other and stored, every time the activation pattern of the first communication units 31 is switched, in accordance with any of the above-mentioned first to third identification methods. When the first communication units 31-1 to 31-$n$ are sequentially activated in accordance with the activation pattern according to the first mode, the radio field intensity of the received query signal and the identification information of the noncontact power supply device 30 including the first communication unit 31 that has output this query signal are associated with each other and stored for each activation pattern. When groups of the first communication units 31 are sequentially activated in accordance with the activation pattern according to the second mode, since query signals are output from a plurality of first communication units 31 in a certain activation pattern, the radio field intensities of the received query signals and the identification information of the respective noncontact power supply devices 30 including the first communication units 31 that have output these query signals are associated with each other and stored for each activation pattern.

In step S202, the ECU 23 in the vehicle 2 determines whether the activation pattern of the first communication units 31 is executed in the first cycle. It can be determined whether the activation pattern is executed in the first cycle, based on whether identification information identical to the identification information associated with the received query signal has already been stored in the storage unit. When the identification information associated with the received query signal has not yet been included in the identification information stored in the storage unit, the activation pattern is still executed in the first cycle, and the process therefore returns to step S201. When the identification information associated with the received query signal has already been included in the identification information stored in the storage unit, the activation pattern is executed in the second cycle, and the process therefore advances to step S203. Upon the completion of the first cycle of the activation pattern, signal output processes have been activated at least once for all the first communication units 31-1 to 31-$n$, except the first communication unit 31 of an already paired noncontact power supply device 30.

In step S203, the ECU 23 in the vehicle 2 searches the radio field intensities stored in the storage unit for a highest radio field intensity, and specifies the noncontact power supply device 30 including a first communication unit 31 that has output a query signal having the highest radio field intensity, based on the identification information stored in association with the highest radio field intensity. The query signals are output from the respective first communication units 31-1 to 31-$n$ at the same radio field intensity, while the smaller the distance between the second communication unit 21 and the first communication unit 31, the higher the radio field intensity of the query signal received by the second communication unit 21. When the noncontact power supply device 30 including a first communication unit 31 that has output a query signal having the highest radio field intensity has been successfully specified in step S203, the process advances to step S204. When the noncontact power supply device 30 including a first communication unit 31 that has output a query signal having the highest radio field intensity has failed to be specified in step S203, the process advances to step S407 in FIG. 5. Alternatively, when the noncontact power supply device 30 including a first communication unit 31 that has output a query signal having the highest radio field intensity has failed to be specified, steps S101, S201, and S202 may be executed again.

Figure 5:
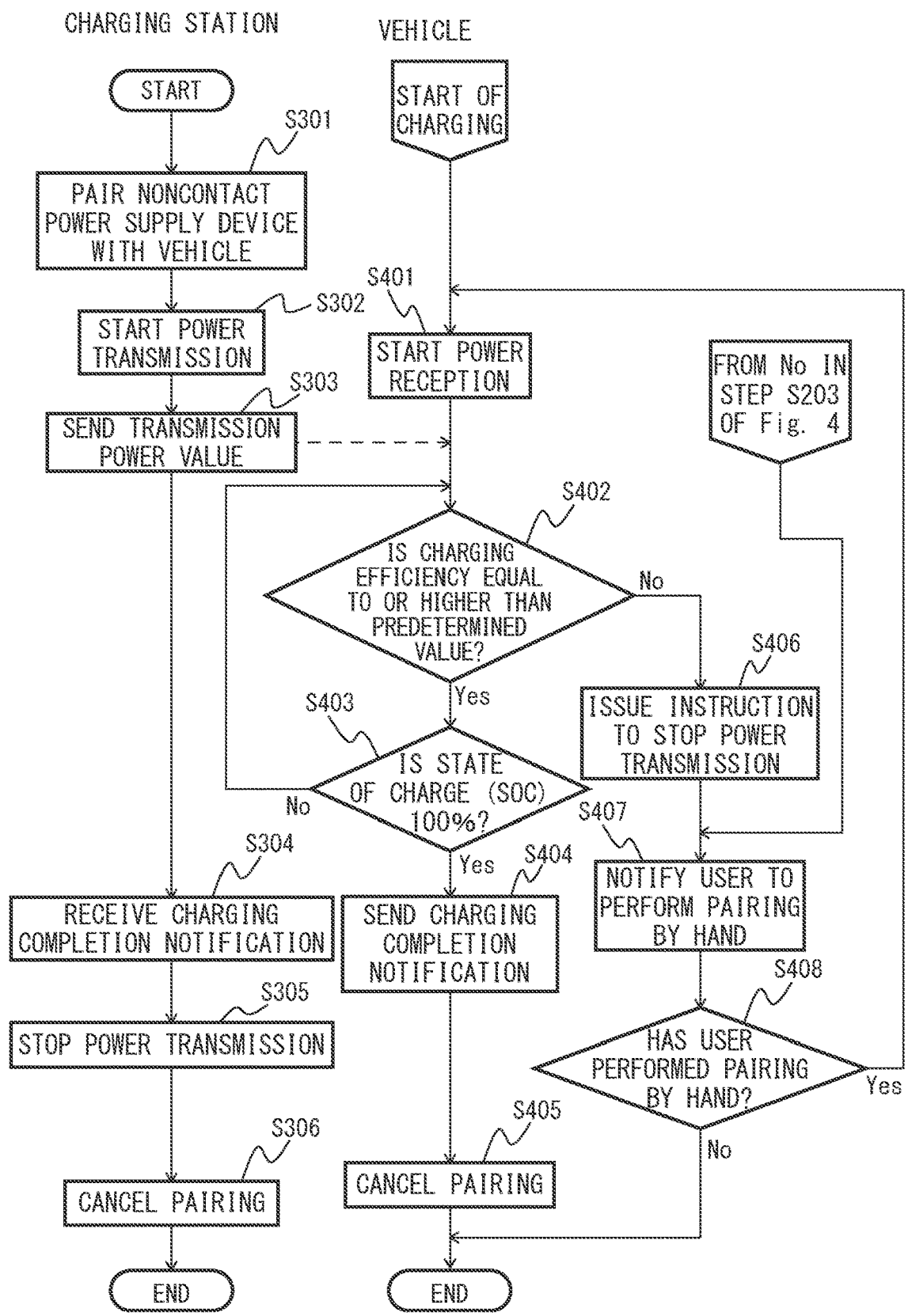
FIG. 5 is a flowchart illustrating an operation sequence associated with noncontact power supply of the vehicle by the noncontact power supply device.

In step S204, the pairing control unit 12 in the vehicle 2 pairs the noncontact power supply device 30 specified in step S203 and the vehicle 2 with each other. After pairing, charging processing illustrated in FIG. 5 is started. In this manner, the pairing control unit 12 pairs the vehicle 2 with the noncontact power supply device 30 including a first communication unit 31 corresponding to a query signal having a highest radio field intensity among the signals output from the respective first communication units 31-1 to 31-$n$ received by the second communication unit 21 of the vehicle 2. In some embodiments, since communication of a directional query signal may not be performed between the first communication unit 31 in the noncontact power supply device 30 and the second communication unit 21 in the vehicle 2, the cost of the communication controller 1 can be kept low.

The pairing processing between the noncontact power supply device 30 and the vehicle 2 will be described herein with reference to FIG. 6 and a specific example illustrated in FIG. 6.

Referring to FIG. 6, the activation control unit 11 activates the first communication units 31 in the order of, e.g., patterns 1 to 4 (step S101). For each of patterns 1 to 4, the received query signal and the identification information of the noncontact power supply device 30 including the first communication unit 31 that has output this query signal are associated with each other and stored (step S201). Since the identification information associated with the query signal received by the second communication unit 21 when pattern 1 is executed again after execution of pattern 4 is identical to the identification information associated with the first communication unit 31-1 already stored in the storage unit, it is determined that the activation pattern is executed in the second cycle (step S202). Since the vehicle 2 is parked in the parking slot C, the radio field intensity $\alpha 1$ of a query signal output from the first communication unit 31-1 in pattern 1 is lowest, the radio field intensity $\alpha 2$ of a query signal output from the first communication unit 31-2 in pattern 2 and the radio field intensity $\alpha 4$ of a query signal output from the first communication unit 31-4 in pattern 4 are second lowest, and the radio field intensity $\alpha 3$ of a query signal output from the first communication unit 31-3 in pattern 3 is highest ($\alpha 1 < \alpha 2 = \alpha 4 < \alpha 3$). Hence, the ECU 23 in the vehicle 2 specifies the noncontact power supply device 30-3 including the first communication unit 31-3 as a device that has output a query signal having a highest radio field intensity (step S203). The pairing control unit 12 in the vehicle 2 pairs the noncontact power supply device 30-3 and the vehicle 2 with each other (step S204).

Referring to FIG. 7, the activation control unit 11 activates the first communication units 31 in the order of, e.g., pattern 1 to pattern 2 (step S101). The radio field intensity of a query signal from each of the first communication units 31-2 and 31-4 received in pattern 1, and the identification information of a corresponding one of the noncontact power supply devices 30-2 and 30-4 associated with this query signal are associated with each other and stored (step S201). The radio field intensity of a query signal from each of the first communication units 31-1 and 31-3 received in pattern 2, and the identification information of a corresponding one of the noncontact power supply devices 30-1 and 30-3 associated with this query signal are associated with each other and stored (step S201). Since the vehicle 2 is parked in the parking slot C, the radio field intensity $\alpha 1$ of a query signal output from the first communication unit 31-1 in pattern 2 is lowest, the radio field intensities $\alpha 2$ and $\alpha 4$ of query signals output from the first communication units 31-2 and 31-4, respectively, in pattern 1 are second lowest, and the radio field intensity $\alpha 3$ of a query signal output from the first communication unit 31-3 in pattern 2 is highest ($\alpha 1 < \alpha 2 = \alpha 4 < \alpha 3$). Hence, the ECU 23 in the vehicle 2 specifies the noncontact power supply device 30-3 including the first communication unit 31-3 as a device that has output a query signal having a highest radio field intensity (step S203). The pairing control unit 12 in the vehicle 2 pairs the noncontact power supply device 30-3 and the vehicle 2 with each other (step S204).

FIG. 5 is a flowchart illustrating an operation sequence associated with noncontact power supply of the vehicle by the noncontact power supply device.

In correspondence with step S204 in FIG. 4, in step S301, the noncontact power supply device 30 is paired with the vehicle 2.

In step S302, the power transmission circuit 32 of the noncontact power supply device 30 paired with the vehicle 2 starts power transmission to the vehicle 2, and in step S401, the power reception circuit 22 of the vehicle 2 paired with the noncontact power supply device 30 starts power reception. In power transmission by the power transmission circuit 32, in step S303, the controller 33 in the noncontact power supply device 30 sends data associated with a transmission power value at this point of time to the vehicle 2 via the first communication unit 31 or other communication units, for each predetermined period.

In step S402, the ECU 23 in the vehicle 2 calculates a charging efficiency (=(Transmission Power Value)/(Value of Received Power)×100) based on the data associated with the received transmission power value and the value of power actually received at this point of time, and determines whether the charging efficiency is equal to or higher than a predetermined value (e.g., 70%).

When it is determined in step S402 that the charging efficiency is equal to or higher than the predetermined value, correct pairing is expected to have been successfully done, and the process therefore advances to step S403. In step S403, the ECU 23 in the vehicle 2 determines whether the SOC (State Of Charge) of the battery 24 has reached 100% (i.e., whether the battery 24 has been fully charged). When it is determined that the state of charge of the battery 24 has reached 100%, the process advances to step S404, or when it is not determined that the state of charge of the battery 24 has reached 100%, the process returns to step S402. In some embodiments, the state of charge used as a reference for the determination processing in step S403 may not always be set to 100%, and this state of charge may be set to, e.g., a value (e.g., 90%) close to 100%.

In step S404, the ECU 23 in the vehicle 2 sends a charging completion notification to the paired noncontact power supply device 30 via the second communication unit 21 or other communication units, and in response to this sending, the noncontact power supply device 30 receives the charging completion notification in step S304. In step S305 subsequent to step S304, the noncontact power supply device 30 stops power transmission. In step S306, the noncontact power supply device 30 cancels pairing with the vehicle 2, and in step S405, the vehicle 2 cancels pairing with the noncontact power supply device 30. After that, the process ends.

When it is not determined in step S402 that the charging efficiency is equal to or higher than the predetermined value, erroneous pairing is more likely to have occurred, and the process therefore advances to step S406. In step S406, the ECU 23 in the vehicle 2 instructs the paired noncontact power supply device 30 to stop power transmission via the second communication unit 21 or other communication units, and in response to this instruction, the noncontact power supply device 30 stops power transmission and cancels pairing with the vehicle 2. In step S407 subsequent to step S406, the ECU 23 in the vehicle 2 notifies the user to perform paring by hand via, e.g., a display in the vehicle 2. After that, in step S408, the ECU 23 in the vehicle 2 determines whether the user has performed paring by hand. When it is determined in step S408 that the user has performed paring by hand, the process returns to step S401 (and step S301). When it is not determined in step S408 that the user has performed paring by hand, the process ends.

When the noncontact power supply device 30 including a first communication unit 31 that has output a query signal having the highest radio field intensity has failed to be specified in step S203 of FIG. 4 as well, in step S407 the ECU 23 in the vehicle 2 notifies the user to perform paring by hand via, e.g., a display in the vehicle 2. After that, in step S408, the ECU 23 in the vehicle 2 determines whether the user has performed paring by hand. When it is determined in step S408 that the user has performed paring by hand, the process returns to step S401 (and step S301). When it is not determined in step S408 that the user has performed paring by hand, the process ends.

In the above-mentioned flowchart, the charging efficiency is calculated by the ECU 23 in the vehicle 2 (step S402), but as an alternative example, the charging efficiency may be calculated by the controller 33 in the noncontact power supply device 30. In this alternative example, after the start of power reception by the vehicle 2 in step S401, the ECU 23 in the vehicle 2 sends data associated with a reception power value at this point of time to the paired noncontact power supply device 30 via the second communication unit 21 or other communication units, for each predetermined period. The controller 33 in the noncontact power supply device 30 calculates a charging efficiency (=(Reception Power Value)/(Value of Transmitted Power)×100) based on the data associated with the received reception power value and the value of power actually transmitted at this point of time, and determines whether the charging efficiency is equal to or higher than a predetermined value (e.g., 70%). The determination result is sent to the vehicle 2 via the first communication unit 31 or other communication units, and step S403 or S406 is executed based on this determination result.

<Another Embodiment in which Activation Control Unit is Provided in Vehicle>

The activation control unit 11 is provided in the charging station 3 in the above-described embodiment, but the activation control unit 11 may be provided in the vehicle 2, as will be described below with reference to FIGS. 10 to 12 as another embodiment.

Figure 10:
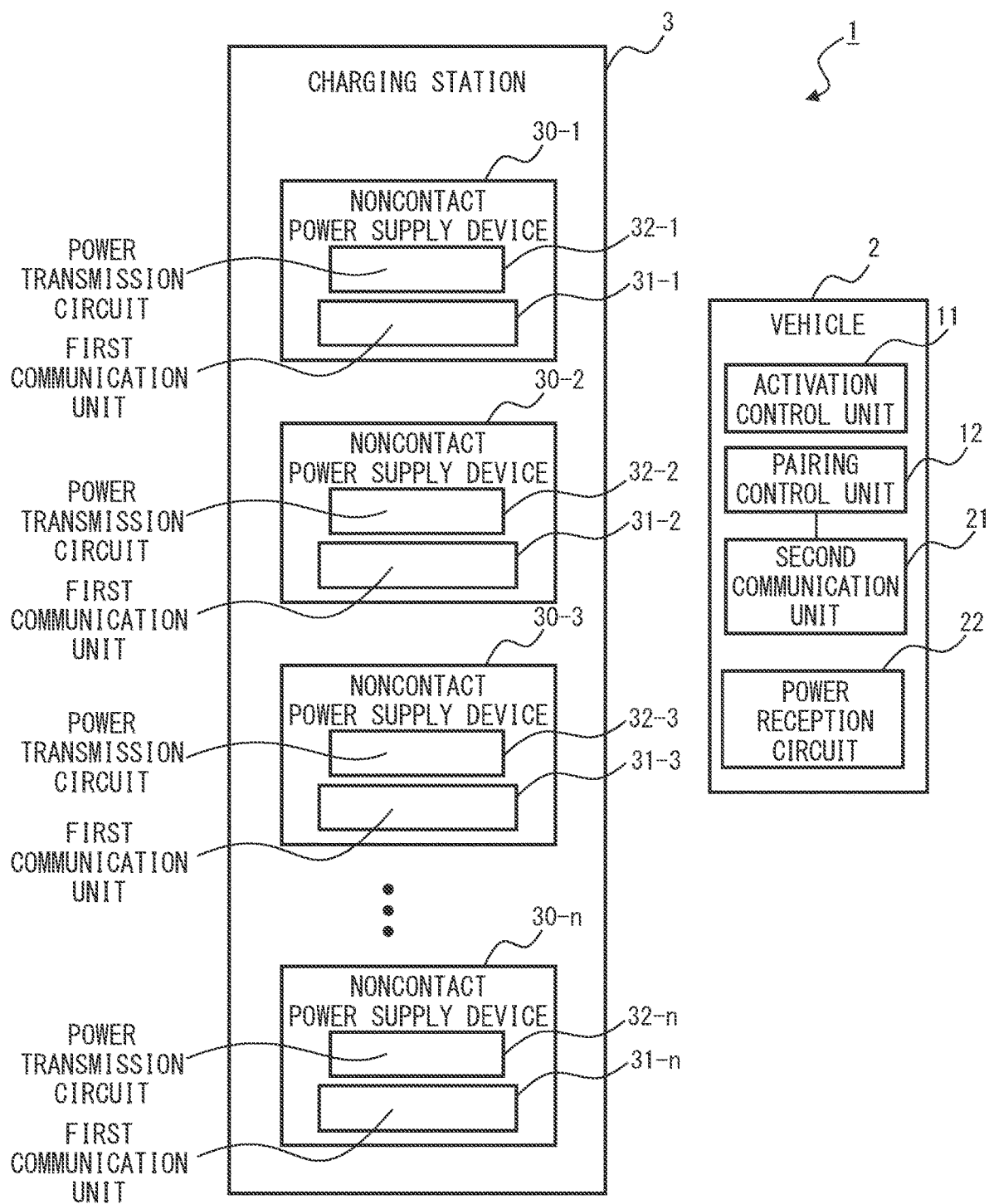
FIG. 10 is a block diagram schematically illustrating the configuration of a noncontact power supply system including a communication controller according to another embodiment of the present disclosure.
Figure 11:
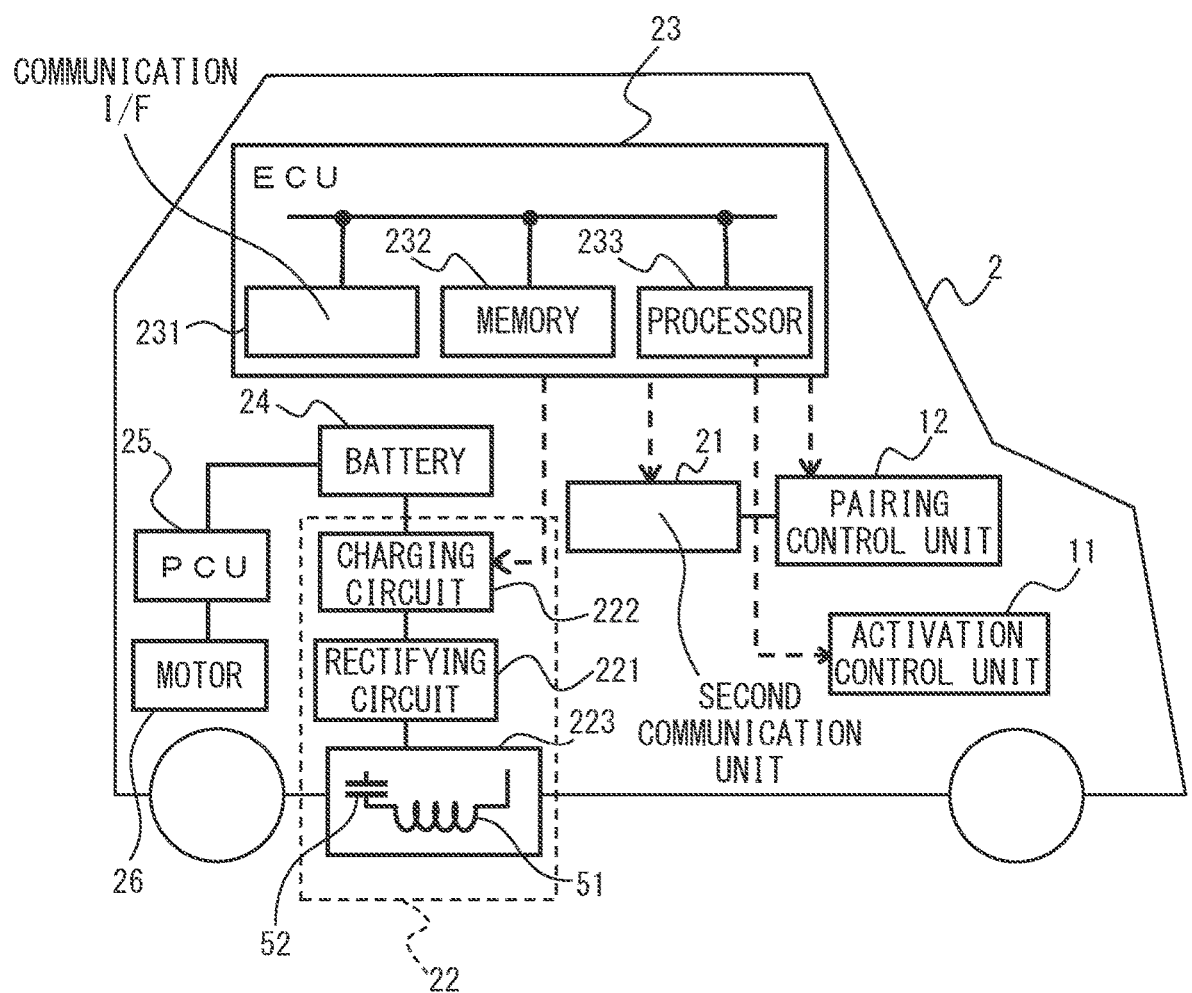
FIG. 11 is a block diagram schematically illustrating the configuration of a vehicle in the noncontact power supply system illustrated in FIG. 10.

FIG. 10 is a block diagram schematically illustrating the configuration of a noncontact power supply system including a communication controller according to another embodiment of the present disclosure. FIG. 11 is a block diagram schematically illustrating the configuration of a vehicle in the noncontact power supply system illustrated in FIG. 10. In this embodiment of the present disclosure, the activation control unit 11 is provided in the vehicle 2. The ECU 23 in the vehicle 2 controls the activation control unit 11, in addition to controlling the charging circuit 222, the PCU 25, the second communication unit 21, and the pairing control unit 12. Other configurations in the vehicle 2 are the same as described above with reference to FIG. 3.

Figure 12:
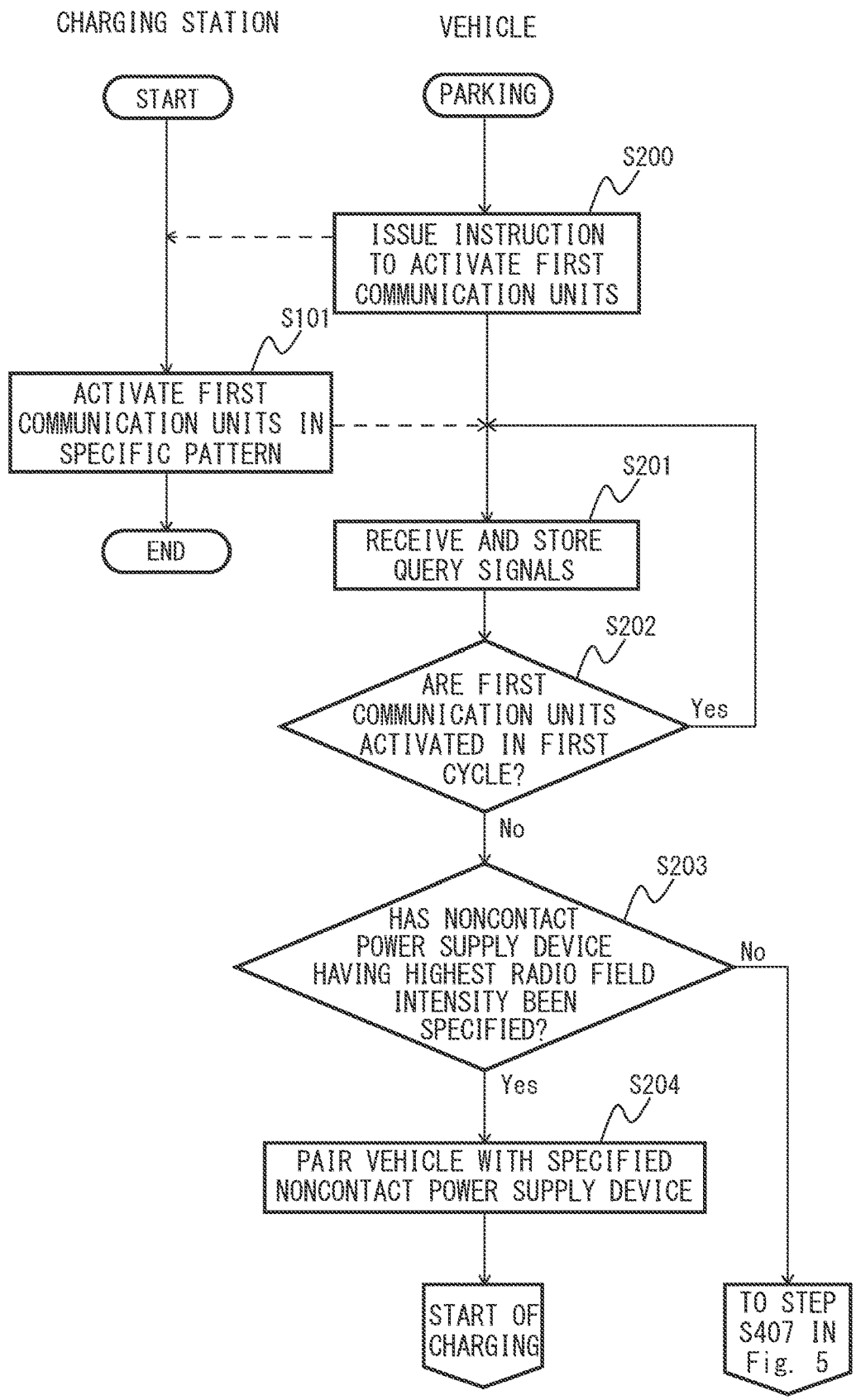
FIG. 12 is a flowchart illustrating the operation sequence of the communication controller according to the other embodiment of the present disclosure.

FIG. 12 is a flowchart illustrating the operation sequence of the communication controller according to the other embodiment of the present disclosure.

As illustrated in FIG. 12, the operation of the communication controller 1 when the activation control unit 11 is provided in the vehicle 2 is different from that of the communication controller 1 when the activation control unit 11 is provided in the charging station 3, described above with reference to FIG. 4, in terms of executing step S200.

First, a user (driver) parks the vehicle 2 in one of a plurality of parking slots provided in the charging station 3. Then, the user (the driver or any passenger) riding in the vehicle 2, for example, instructs the communication controller 1 to start its operation by operating a predetermined operation button provided in the vehicle 2. In step S200, the activation control unit 11 provided in the vehicle 2 performs control via the second communication unit 21 or other communication units to activate signal output processes of the respective first communication units 31-1 to 31-$n$ of the noncontact power supply devices 30-1 to 30-$n$ in the charging station 3 in a specific activation pattern so that signals output from the respective first communication units 31-1 to 31-$n$ cause no radio frequency interference with each other. A first communication unit 31 (i.e., a first communication unit 31 in the ON state), the signal output process of which is activated by the activation control unit 11, outputs a query signal, while a first communication unit 31 (i.e., a first communication unit 31 in the OFF state), the signal output process of which is not activated by the activation control unit 11, outputs no query signal. The respective processes of steps S101 and S201 to S204 subsequent to step S200 are the same as described above with reference to FIG. 4. The charging processing subsequent to these processes is also the same as described above with reference to FIG. 5.

According to the present disclosure, by activating signal output processes of respective noncontact power supply devices so that signals output from the respective noncontact power supply devices cause no radio frequency interference with each other, and pairing a vehicle with a noncontact power supply device that has output a signal having a highest radio field intensity, the possibility that erroneous pairing will occur can be lowered. In some embodiments, since directional communication may not be performed, the cost can be kept low.

Although embodiments according to the present disclosure have been described above, the present disclosure is not limited to these embodiments, and various modifications and changes can be made without departing from the scope of claims.

The invention claimed is:

1. A communication controller comprising:
an activation control unit configured to activate signal output processes of respective first communication units of a plurality of noncontact power supply devices so that signals output from the respective first communication units cause no radio frequency interference with each other; and
a pairing control unit configured to pair a vehicle with the noncontact power supply device including a first communication unit corresponding to a signal having a highest radio field intensity among the signals output from the respective first communication units and received by a second communication unit of the vehicle,
wherein the activation control unit sequentially activates the signal output processes of the respective first communication units at different activation timings.

2. The communication controller according to claim 1, wherein the activation control unit activates the signal output processes of the respective first communication units to output signals having an equal radio field intensity.

3. The communication controller according to claim 1, wherein the activation control unit does not activate a signal output process of a first communication unit of an already paired noncontact power supply device among the first communication units.

4. The communication controller according to claim 1, wherein the activation control unit is provided in a charging station including the plurality of noncontact power supply devices.

5. The communication controller according to claim 1, wherein the activation control unit is provided in the vehicle.

6. A communication controller comprising:
an activation control unit configured to activate signal output processes of respective first communication units of a plurality of noncontact power supply devices so that signals output from the respective first communication units cause no radio frequency interference with each other; and
a pairing control unit configured to pair a vehicle with the noncontact power supply device including a first communication unit corresponding to a signal having a highest radio field intensity among the signals output from the respective first communication units and received by a second communication unit of the vehicle,
wherein the activation control unit sequentially activates the signal output processes for each group of the first communication units located at positions, at which the first communication units cause no radio frequency interference with each other, at an activation timing that varies in the each group.

7. The communication controller according to claim 6, wherein the activation control unit is provided in a charging station including the plurality of noncontact power supply devices.

8. The communication controller according to claim 6, wherein the activation control unit is provided in the vehicle.

* * * * *